United States Patent Office 3,692,569
Patented Sept. 19, 1972

3,692,569
SURFACE-ACTIVATED FLUOROCARBON
OBJECTS
Walther Gustav Grot, Chadds Ford, Pa., assignor to E. I.
du Pont de Nemours and Company, Wilmington, Del.
No Drawing. Continuation-in-part of application Ser. No.
779,265, Nov. 26, 1968, which is a continuation-in-part
of application Ser. No. 595,332, Nov. 18, 1966. This
application Feb. 12, 1970, Ser. No. 10,997
Int. Cl. B44d 1/09; B32b 27/06
U.S. Cl. 117—138.8 UF          8 Claims

ABSTRACT OF THE DISCLOSURE

The surface activity of a fluorocarbon polymer having the surface character ranging from no surface activity to some surface activity is increased by coating the polymer with a copolymer of a fluorinated ethylene and a sulfonyl-containing fluorinated vinyl monomer. The fluorocarbon polymer is thereby rendered water-wettable, printable, and cementable. Porous sheeting of the so-coated fluorocarbon polymer is useful as an electrochemical cell matrix and non-porous, ion conductive sheeting thereof can be used as a fuel cell membrane.

---

This application is a continuation-in-part of U.S. patent application Ser. No. 779,265, filed Nov. 26, 1968, and now abandoned, which is in turn a continuation-in-part of U.S. patent application Ser. No. 595,332, filed Nov. 18, 1966, both to the same inventor and now abandoned.

The present invention relates to fluorocarbon objects, and, more particularly, to surface-active fluorocarbon objects.

Fluorocarbon polymers are useful in forming shaped objects due to their excellent electrical properties, chemical resistance, low water reactivity, and non-wettability. However, the water resistance and non-wettability of such fluorocarbon polymers make it difficult to cement such fluorocarbon objects to other surfaces or to coat fluorocarbon surfaces with other substances. There have been numerous attempts at chemical modification of fluorocarbon polymers to overcome the latter problems. Thus, fluorocarbon sulfonic acid polymers and fluorocarbon amide polymers have satisfactory surface properties for the uses mentioned above, but fabricate less well than unmodified fluorocarbon polymers. Modified fluorocarbon polymers generally have less satisfactory electrical or chemical properties.

This invention provides composite structures of fluorocarbon polymers. In one aspect, this invention provides surface-active fluorocarbon objects, i.e., objects which have in their main bulk the properties of an inert fluorocarbon polymer and, on the surface, the properties of a chemically modified fluorocarbon copolymer. Hence, the surface of the object is, for example, dyeable with cationic dyes, such as methylene blue, and cementable. In this aspect of the invention, the substrate of fluorocarbon polymer is normally not wettable by water and the coating on the substrate is wettable by water, thereby rendering the composite structure water wettable. In another aspect of the present invention, the substrate of fluorocarbon polymer is chemically active or water wettable to some degree and the coating thereon is of greater chemical activity. This invention also provides a method for the manufacture of such composite structures or objects.

The surface-active fluorocarbon objects of this invention comprise a fluorocarbon core and, coated onto the core, a fluorocarbon copolymer having chemically active sulfonyl groups pendant directly or indirectly from the main copolymer chain. The coating copolymer can be described as a normally solid copolymer of at least two copolymerizable fluorinated vinyl monomers, one of which contains the sulfonyl group. Preferably, but not necessarily, the sulfonyl group is the sulfonic acid group —$SO_3H$. However, the sulfonyl group can be a precursor to the acid. Usually, the precursor will be the sulfonyl fluoride group —$SO_2F$. The sulfonyl group can be further described as being represented by the group —$SO_2M$ wherein M is F, Cl, OH, or amine or the group —OMe wherein Me is alkali metal or quaternary ammonium.

The fluorocarbon core to be coated according to this invention can, for example, be an extruded, cast, or molded object and can be solid or porous. The coating can either fill the pores or just coat the pores, depending on the amount of coating and method of coating used. The composition of the core can be varied, and is selected according to the properties desired in the product. Typically, the core composition illustrative of fluorocarbon polymers useful as the core are the tetrafluoroethylene polymers including homopolymer (monomer referred to as TFE) and copolymers with other copolymerizable fluorinated vinyl monomers, such as hexafluoropropylene (referred to herein as HFP). Generally, the copolymer forming the core will contain no more than 45 percent by weight of the copolymerizable monomer. The copolymerizable monomer can also be a sulfonyl containing vinyl monomer to be hereinafter described with respect to the coating composition whereby the core would not be inert in the respect of chemical inactivity. However, the amount of sulfonyl groups in the core would be considerably less than the amount of such groups present in the coating, whereby the coating increases the apparent chemical activity of the composite structure.

It is obvious that the fluorocarbon core can be of fluorocarbon only, or can itself be an object coated with a fluorocarbon polymer which in turn acts as a substrate for the sulfonyl-containing copolymer. For example, the "fluorocarbon core" of this invention can be a metallic wire insulated with a layer of fluorocarbon polymer or other substrate coated with fluorocarbon polymer.

The coating copolymer employed in this invention comprises as the major comonomer compounds such as fluorinated ethylenes. Illustrative of such fluorinated ethylene compounds are vinyl fluoride, HFP, vinylidene fluoride, trifluoroethylene, chlorotrifluoroethylene, perfluoro (alkyl vinyl ether), and tetrafluoroethylene (TFE) and combinations thereof.

With respect to the sulfonyl-containing comonomer component of the coating copolymer in terms of the usual precursor —$SO_2F$, one example of such comonomer is $CF_2\!=\!CFSO_2F$. Additional examples can be represented by the generic formula $$CF_2\!=\!CFR_fSO_2F$$ 

wherein $R_f$ is a bifunctional perfluorinated radical comprising 2–8 carbon atoms. The particular chemical content or structure of the radical linking the sulfonyl group to the copolymer chain is not critical since it is the sulfonyl group that imparts the surface modification to the fluorocarbon core. Thus, the linking radical can be any group which has the stability to undergo coating and the particular use desired. Thus, for example, the $R_f$ radical of the formula above can be either branched or unbranched, i.e., straight-chained, and can have one or more ether linkages. It is preferred that the vinyl radical in this group of sulfonyl-fluoride containing comonomers be joined to the $R_f$ group through an ether linkage, i.e., that the comonomer be of the formula $CF_2=CFOR_fSO_2F$. Illustrative of such sulfonyl fluoride-containing comonomers are:

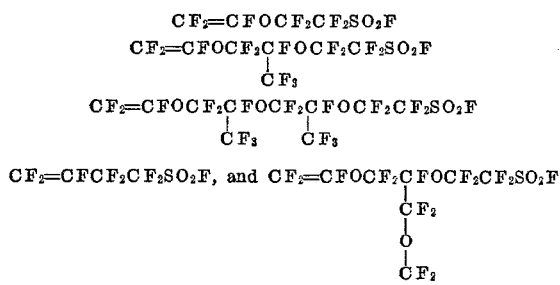

The preferred sulfonyl fluoride-containing comonomer is perfluoro(3,6 - dioxa - 4 - methyl - 7 - octenesulfonyl fluoride),

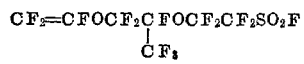

referred to herein as PDMOF.

The optimum coating copolymer is a copolymer of TFE and PDMOF which comprises 5–60%, preferably 11–40%, PDMOF. The sulfonyl-containing monomers are disclosed in such references as U.S. Pat. No. 3,282,875 to Connolly et al. and U.S. Pat. No. 3,041,317 to Gibbs et al., and in U.S. patent application Ser. No. 779,273 to Grot, and U.S. patent application Ser. No. 779,235 to Resnick now U.S. Pat. No. 3,560,568, both filed on Nov. 26, 1968.

The coating copolymer used in the present invention is prepared by the general polymerization techniques developed for homo- and copolymerizations of fluorinated ethylenes, particularly those employed for TFE, which are described in the literature. Nonaqueous techniques for preparing the coating copolymers of the present invention include that of U.S. Pat. 3,041,317, issued to H. H. Gibbs and R. N. Griffin on June 26, 1962, that is, by the polymerization of a mixture of the major monomer therein, such as TFE, and a sulfonyl fluoride in the presence of a free radical initiator, preferably a perfluorocarbon peroxide or azo compound, at a temperature in the range 0–200° C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene, and the like.

Aqueous techniques for preparing the coating copolymer of this invention include contacting the monomers with an aqueous medium containing a free-radical initiator to obtain a slurry of polymer particles in non-water-wet or granular form, as disclosed in U.S. Pat. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. 2,559,752, issued to K. L. Berry on July 10, 1951, and U.S. Pat. 2,593,583, issued to J. F. Lontz on Apr. 22, 1952.

The fluorocarbon core can be coated according to this invention by several techniques; for example, by dipping the fluorocarbon core in a dispersion or solution of the coating copolymer in the sulfonyl fluoride form, whereby the copolymer adheres to the surface of the core, or by wrapping the core with a film of the copolymer. The coating is then, but not necessarily, thermally fused to the core, depending on the degree of adherence desired. When the coating is in the pores of porous fluorocarbon core, the coating is mechanically interlocked with the core and therefore fusion is generally not necessary.

The liquid medium employed in the coating dispersions described above is water. The solvent employed in the solution coating technique is a high boiling, i.e., above 130° C., hydrocarbon or chlorinated hydrocarbon solvent. Those solvents boiling above 170° C. are preferred. The solvent acts as a diluent to achieve a viscosity range wherein a moderate thickness of the coating copolymer can be deposited upon the core. The boiling point is an important criterion in the selection of the solvent. Illustrative of such solvents are: ortho-dichlorobenzene, symmetrical trichlorobenzene, perfluorokerosene, halocarbon oil, etc.

The time during which the fusion step of this invention is carried out is, of course, dependent upon the nature of the materials, the temperature of the fusion step, etc. If fusion is carried out in an oven, a total fusion time of about a minute often will suffice. When flaming is used to fuse the layers together (as described in Example III), fusion can be accomplished in as little as one-fiftieth of a second.

The sulfonyl fluoride groups on the exterior of the fluorocarbon object of this invention are easily converted, according to this invention, to other groups. For example, at least some of the sulfonyl fluoride groups are converted to sulfonate groups by contacting the object with an aqueous base solution. Illustrative of useful bases are alkali, alkaline earth, ammonium, and organo-substituted ammonium hydroxides. At least some of the sulfonate groups may then optionally be converted to sulfonic acid groups by contact with a strong protonic acid.

At least some of the sulfonyl fluoride groups on the exterior of the fluorocarbon object can be converted to sulfonamide groups by contact with ammonia (as in Example V) or amines.

One example of a fluorocarbon object of the present invention is where the fluorocarbon core is porous sheeting of polytetrafluoroethylene, such as the biaxially oriented sheeting disclosed in British Pat. 974,817 and British Pat. 1,049,328, coated exteriorly and in the pores with a coating copolymer hereinbefore described. The coating can be done by solution casting coating copolymer onto the sheeting in sufficient quantity to either coat the pores of the sheeting, leaving them open, or entirely filling the pores. Preferred solutions are those disclosed in U.S. patent application Ser. No. 779,203 to Grot, filed on Nov. 26, 1968. Another method of coating is to mix the coating copolymer, in amounts up to 50 percent by weight, with polytetrafluoroethylene in advance of fabrication into sheeting. When the pores of the sheeting are filled by the copolymer coating and the coating communicates through the thickness of the sheeting, the resultant composite structure is ionically conductive and can be used as a fuel cell membrane. When the pores of the sheeting are left open by the copolymer coating, the resultant composite structure is useful as a fuel cell matrix, battery separator, or filter. The porosity of such sheeting or other fluorocarbon cores can be augmented or provided by conventional techniques, such as by incorporating leachable particulate agents such as magnesium hydroxide, calcium carbonate, sodium carbonate, or sodium sulfate into the polymer and leaching such agents out after the sheeting is formed. The coating copolymer can enter the resultant pores to provide a core which is both internally and externally coated with the coating polymer.

Preferably, the porous sheeting is made using polytetrafluoroethylene which is made by the dispersion polymerization process because of the high specific surface area (internal and external surface area) of the resultant polytetrafluoroethylene fine powder. The polytetrafluoroethylene is blended with the leachable particulate agent such as by blending dispersions of one or both thereof together followed by drying or by dry blending together. The resultant blend is formed into a sheet before the drying step. Preferably, the particulate agent has a particle size of no greater than five microns which leaves correspondingly small void spaces or pores in the sheeting after leaching. Sufficient agent should be present uniformly dispersed in the sheeting prior to leaching to provide a pore volume after leaching of at least 40 percent of the volume of the sheet. When the sheeting is to be used in an electrochemical cell, the maximum particle size and corresponding pore size is preferably no greater than one micron and the pore volume preferably at least 65 percent. This high pore volume also provides an open cell structure so that the sheeting is permeable to aqueous electrolyte. It is convenient if the particulate agent is water soluble, but agents which are soluble in organic solvents or acidic or basic solutions only can be used especially when water is present in the blending step.

The resultant porous polytetrafluoroethylene sheet is an especially useful core for coating by the coating copolymer hereinbefore described. The high internal and external surface area of the sheeting and the large pore volume of the polytetrafluoroethylene making up the sheet and provided by the leached-out particulate agent provide sufficient surface for coating by the coating copolymer to provide the wettability to electrolyte required for good electrochemical cell operation. As previously explained, the coating copolymer can be coated onto the core from a solution, but in the case of the preferred porous polytetrafluoroethylene sheeting just described, such solution coating, whether by casting the solution onto the sheet or by dipping the sheet into the copolymer solution, even with the assist of vacuum, does not provide maximum wettability to the sheet. Presumably, the coating copolymer does not enter all the minute pores of the sheet by the solution coating technique, with the result that the uncoated pores do no fill with aqueous electrolyte during use. This coating method also tends to reduce the pore volume of the sheeting which requires that the pore volume of the uncoated sheeting be sufficiently above 65 percent to retain this amount of porosity after coating. The resulting coating sheet will exhibit less than optimum resistivity in an electrochemical cell, which is satisfactory in some applications but not in those where high cell performance is required.

The preferred method of coating, i.e., getting the coating copolymer into the pores of the sheeting, is to blend the copolymer contained in a liquid carrier, i.e. dispersion or solution, with a dispersion of polytetrafluoroethylene before or together with blending with the leachable particulate agent. Sufficient coating copolymer should be present so that the resultant sheeting after leaching out of the agent is from 10–50 percent by weight of the copolymer based on the total weight of polymer in the sheeting. The resultant open-celled sheeting is apparently coated by the coating copolymer throughout, as evidenced by improved wettability and substantially reduced resistivity of the sheeting over the sheeting obtained by the aforementiond dispersion or solution coating process. The complete internal and external wettability of the sheeting which is coated by blending in demonstrated by the translucent appearance of the sheet turning to transparency when in contact with water. Preferably, this sheeting also has a pore volume of at least 65 percent. Typically, the porous sheeting whether prepared by the coating method or by the blending method is from 3 to 35 mils thick.

Another example of a fluorocarbon object of this invention is where the fluorocarbon core is a solid or porous sheeting of fluorocarbon polymer containing sulfonyl group side chains and the coating copolymer contains a greater number of the sulfonyl groups in side chains. Similar to the composite structures discussed in the preceding paragraph, the coating copolymer can either form a coating in the pores or fill the pores and the use of the structure would vary accordingly.

Preferred structures of this embodiment of coated object is where the greater number of sulfonyl groups in the copolymer coating is determined by the lowest equivalent weight that can be used and still retain insolubility in the liquid-contact application in which the object is to be used. As for the copolymer core, the fewer number of sulfonyl groups therein provides the strength to the object while maintaining compatibility with the coating copolymer. To this end, the copolymer of fluorinated ethylene with the sulfonyl-containing fluorinated vinyl monomer used in both the coating and the core will usually be the same copolymer, except that the coating and core will have different equivalent weights (weight of one repeat unit of the copolymer). Generally, the equivalent weight of the coating copolymer will be no greater than 1150, and the equivalent weight of the core copolymer will be greater than 1500. When the coated object is non-porous sheeting, the lower equivalent weight copolymer coating enveloping the higher equivalent weight core provides a high conductivity surface which makes the composite sheeting especially useful as a fuel cell membrane capable of achieving good electrical contact with the electrodes of the fuel cell. Thus, this non-porous sheeting can be used as the ion-exchange membrane in the fuel cells of FIGS. 2 and 3, and as well as in the battery of FIGS. 4 and 5 of U.S. patent application Ser. No. 778,961, filed Nov. 26, 1968 by Wolfe (published as French Pat. 1,563,528 and British Pat. 1,184,321) and now abandoned. When the coated object is porous sheeting, such sheeting is preferably made by the blending process hereinbefore described to have the pore size and volume and proportion of coating copolymer as described for the preferred porous sheeting.

Typically, these preferred sheetings are made using the coating copolymer in the sulfonyl fluoride form followed by processing the resultant sheeting to convert at least the exposed sulfonyl fluoride groups to $-SO_2M$ groups, usually $-SO_3H$. When the sheeting (non-porous) is a coating of low equivalent weight copolymer onto a higher equivalent weight core, both the coating and the core are usually brought together and fused to one another with the copolymer in the sulfonyl fluoride form. Subsequently, the sulfonyl fluoride groups are converted to $SO_3M$ groups substantially throughout the sheeting by prolonged base and acid treatments so as to make the sheeting ionically conductive.

Another example of a fluorocarbon object of this invention is a fluorocarbon fiber coated with sulfonyl-containing copolymers hereinbefore described. Fluorocarbon fibers have been produced commercially for a number of years. The preferred fibers are polytetrafluoroethylene fibers of the type described in U.S. Pat. 2,772,444 and U.S. Pat. 2,776,465. Such fibers in the form of continuous filaments or short length fibers such as staple fibers or floc may be coated by immersion in a solution or dispersion of the coating copolymer. Preferably, the treated fiber is heated to improve adherence of the coating to the fiber. If the sulfonyl group on the coating polymer is sulfonyl fluoride, the fiber should be treated, as with a base such as sodium hydroxide, to convert some of the sulfonyl fluoride groups to $-SO_2M$ groups. While the amount of coating copolymer may be varied as required by the specific end use, the amount of coating is usually small, something approaching a monomolecular layer being satisfactory in most cases. In addition, it is generally not necessary that the entire fiber surface be coated. Application of the coating to a substantial portion of the surface will usually prove satisfactory. The resultant coated fibers have the advantage of possessing a much higher coefficient of friction than untreated fibers, and consequently, processibility into constructions such as nonwoven fabrics which heretofore could not be produced from polytetrafluoroethylene fibers in a satisfactory manner. The coated fibers also have the advantage that they are cementable to metal or other backing materials without the use of expensive procedures employed by the prior art such as etching the surface of the fiber or the weaving together of the polytetrafluoroethylene fiber with a cementable fiber to form a double-face fabric which is cementable on one side. Other applications for the fibers of this invention, for which the prior art fluorocarbon fibers are not suitable, are in production of battery separators, Hooker cell diaphragms and special papers.

The following examples are presented to illustrate but not to restrict the present invention. Percentages and parts are expressed by weight unless otherwise noted. When percentage by weight of monomer is referred to, this means of total monomer.

The fluorocarbon resin which was employed as the core in the examples below, either alone or as a wire coating, was a TFE-HFP copolymer comprising approximately 10 mole percent, or 15 weight percent of HFP, having a melt viscosity of $6-8 \times 10^4$ poises at 380° C. The preparation thereof is described in U.S. Pat. 2,946,763, issued on July 26, 1960 to M. I. Bro and B. W. Sandt.

EXAMPLE I

The core employed herein was a metallic wire insulated with a layer of the TFE-HFP copolymer described above. The wire comprised seven strands of 10-mil copper wire (one in the center and six disposed around it) which had been coated with a thin layer of silver. Around the resultant bundle there was a nominal 10-mil coating of the TFE-HFP resin.

The copolymer employed to coat the core was a copolymer of TFE and PDMOF, comprising 13 weight percent PDMOF. The coating copolymer, according to two successive differential thermal analyses, was found to have successive melting points of 317 and 315° C., and a freezing point of 300° C. was observed in each analysis.

The coating copolymer was prepared as follows: into a 6000-ml. horizontal autoclave there was charged 345 grams of PDMOF, 5 grams of ammonium perfluorocaproate (as a dispersing agent), 2000 ml. of triply distilled water, and 200 ml. of a 1% solution of ammonium persulfate initiator in triply distilled water. PDMOF formed a separate liquid layer, which was more dense than the aqueous layer. The autoclave was evacuated, purged with nitrogen, then re-evacuated. The contents of the autoclave were agitated by a paddle-wheel agitator at 105 r.p.m. TFE was pressured into the autoclave, the pressure of TFE being maintained at about 50 p.s.i.g. throughout the run. The temperature was raised to 70° C. and held for 286 minutes. The contents of the autoclave were recovered and the unreacted liquid comonomer was separated by decanting. The aqueous layer was a dispersion containing about 24% of the copolymer.

The core as described above was passed through an aqueous dispersion containing 50% by weight of the coating copolymer. The depth of the dispersion was about 1 inch, and the core was passed through the dispersion at a rate of about 2 feet per minute. The coated core then moved upward at a speed of 2 feet per minute through a 15-inch long tube furnace maintained at 350° C., to fuse the copolymer coating (about 1/10-mil thick) to the core. The coated core was then immersed for 1 hour at 50° C. in a solution containing 20 grams of sodium hydroxide, 100 ml. of water, and 100 ml. of methanol.

The surface of the coated object had disposed thereon sulfonate groups and hence was cementable and dyeable with cationic dyes such as methylene blue.

EXAMPLE II

A laminate was formed from a 10-mil thick film of the TFE-HFP copolymer described above and 2-mil film of a copolymer of TFE and PDMOF comprising 38% PDMOF.

The coating copolymer was characterized by the following melt viscosity: $4 \times 10^4$ poises at 200° C. and $3.7 \times 10^3$ at 225° C. The coating copolymer was prepared in a 2000-ml. horizontal autoclave. There was charged into the autoclave 1100 grams of PDMOF and 2 ml. of 9% solution of perfluoropropionyl peroxide in

$CCl_2F—CClF_2$

The autoclave was evacuated, purged with nitrogen, then re-evacuated. TFE was added at room temperature to a pressure of 150 p.s.i.g. The temperature was raised to 45° C., then the TFE pressure was adjusted to 170 p.s.i.g. The reaction was continued at that temperature and pressure for about 3 hours, until about 100 grams of TFE had been consumed. The autoclave was then opened and the PDMOF was removed under vacuum to yield 180 grams of a rubbery copolymer.

A 2-mil film of the coating copolymer was fused to the surface of the 10-mil TFE-HFP film at 300° C. under a pressure of about 1-2 tons per square inch. The resultant laminate was treated with sodium hydroxide as described in Example I.

EXAMPLE III

An endless tape of TFE-HFP copolymer described above, about ½-inch wide and 10 mils thick, was sprayed with an aqueous dispersion containing about 25% of the copolymer of TFE and PDMOF described in Example I. The tape thus coated was then flamed with a gas-oxygen torch using the hottest flame obtainable with a No. 5 tip, as the tape passed over and was supported by a 4-inch diameter brass drum, rotating at a speed of about 100–200 r.p.m. Approximately three passes were made under the torch, for a total contact time of about one-fiftieth of a second. The thickness of the coating was about 1/10 mil.

EXAMPLE IV

A TFE-HFP coated wire identical to that described in Example I was coated with a 1/10-mil film of a sulfonyl fluoride-containing copolymer. The coating was deposited from a solution of the coating copolymer, rather than a dispersion as in Example I.

The coating copolymer, a copolymer of TFE and PDMOF comprising 43% PDMOF, was prepared by the method detailed in Example II, except that the pressure of TFE in the autoclave was 120 p.s.i.g. at room temperature and 140 p.s.i.g. at 45° C.

The core was pulled through a 40% solution of the copolymer in o-dichlorobenzene, held at 170° C. The solution was about 1 inch deep and the core was pulled through at a rate of about 1 foot per minute. The core was then pulled through a furnace held at 250° C. at the same rate, as was done in Example I. The o-dichlorobenzene evaporated during the thermal treatment. The coated core was then immersed for 1 hour at room temperature in a solution of 10 grams of sodium hydroxide, 40 grams of methanol, and 50 grams of water. The surface of the object thus treated was cementable and could be dyed with cationic dyes such as methylene blue.

EXAMPLE V

The reactivity of the coating copolymer of the surface-active fluorocarbon objects, of this invention is illustrated by the following experiment, in which the coating copolymer of Example II was employed.

A 2-mil film of the TFE-PDMOF copolymer was submerged in anhydrous ammonia at −30° C. overnight.

The film was recovered, and infrared analysis showed the presence of an additional broad band at 3.05 microns, attributable to the sulfonamide groups.

Similar ammonolysis reactions can be carried out with amines.

EXAMPLE VI 900 ml. of an aqueous dispersion of polytetrafluoroethylene containing 33.5 percent solids was mixed with 300 ml. of an aqueous TFE/PDMOF copolymer dispersion containing 28 percent solids in the form of a TFE/PDMOF copolymer containing 37 percent PDMOF and 63 percent TFE. The dispersion mixture was coagulated by shear using a high speed mixer. The coagulated mixture was filtered and dried.

56 gm. of the dried polymer mixture and 227 gm. anhydrous sodium sulfate powder are slurried with 250 ml. of Stoddard solvent and filtered. The wet filter cake was first rolled by hand with a 2 inch stainless steel rolling pin until it had gained enough strength to be fed to an 8 inch diameter rolling mill. After each rolling pass, the thickness of the sheet was doubled by folding and the sheet turned 90° to obtain biaxial orientation. The original opening of the twin rolls was 110 mils; it was gradually reduced to 25 mils during the rolling. A total of 12 passes were made.

The sheet was dried in a vacuum oven at 120° C. A part of the sheet was then sintered for 5 minutes at 360°, another part was heated 3 minutes to 285° C., and a third part was not heated. After leaching with water, all 3 parts were treated for 2 hours with a 10 percent sodium hydroxide solution at 80° C. in order to convert sulfonyl fluoride groups of the copolymer to —$SO_3Na$ groups. The sheets were then leached with water again and dried. All 3 parts were wettable with water and were uniformly stained with methylene blue.

This experiment was repeated, except that the leachable particulate agent was magnesium hydroxide (maximum particle size about 0.10 micron) and 345 g. of this agent was added to 1 liter of water in an osterizer blender, and during blending, a mixture of 200 ml. of the TFE dispersion described above and 50 ml. of the copolymer dispersion described above was added to the blender. The resultant mixture thickened as the TFE from the dispersion coagulated. Sufficient water was removed by filtration until the polymer mixture had a dough-like consistency. This mixture was made into sheeting by substantially the same hand and machine rolling process described above, except that the 25 mil thick finished sheeting while still wet was immersed in a 10 percent aqueous solution of ammonium chloride until the sheet became transparent (about 3 days) indicating that all the magnesium hydroxide had been leached out. The blending and leaching process also hydrolyzes the sulfonyl fluoride groups of the copolymer so that the porous sheeting after leaching required only soaking in 5 percent HCl solution to form sulfonic acid groups throughout the sheeting. The resultant sheeting had an open-cell structure and a pore volume of 74 percent by volume.

EXAMPLE VII

In this experiment, a woven fabric of polytetrafluoroethylene fiber is used as a reinforcing scrim for a film of a copolymer of TFE/PDMOF to improve the burst strength of the film which is an important property in the use of such film as an ion exchange membrane in gaseous fuel cells. The fabric weighed 4.1 oz./yd.$^2$ and had an open structure corresponding to 40% transmission of light. An 11 inch square of this fabric (12 g.) was cleaned with concentrated $HNO_3$, washed and dried, followed by dipping into a one weight percent solution of a copolymer of TFE/PDMOF having an equivalent weight of 950 and melt viscosity of about $1\times10^2$ poises at 225° C. in fluorocarbon solvent (mixture of 9 parts of trichlorotrifluoroethane with one part of FC–75, which is a fluorocarbon ether solvent made by 3M). After drying, the fabric weighed 13 g. The fabric was heated for 5 minutes at about 275° C. to fuse the copolymer to the fabric. The resultant coated fabric was then laminated between two sheets each 4.5 to 5 mils thick, of a copolymer of TFE/PDMOF having an equivalent weight of 1190 and melt viscosity of $4\times10^3$ poises at 225° C., by pressing at 200 p.s.i.g. at about 255° C. using polyester release sheets. The resultant reinforced sheet was 12–13 mils thick. Conversion of the sulfonyl fluoride groups to —$SO_3H$ groups was carried out by soaking in an aqueous solution of triethylamine and NaOH at 70° C., followed by washing and soaking with 3% solution of NaOH to remove the amine and washing and soaking in dilute HCl, washing and drying. The burst strength of the resultant sheeting averaged about 88 p.s.i. as compared to about 60 p.s.i. for the laminate composed of the two sheets of copolymer by themselves.

EXAMPLE VIII

In this experiment, the use of coating copolymer as a dispersing agent for polytetrafluoroethylene fiber is demonstrated. Staple fiber of polytetrafluoroethylene weighing about 50 g. (fibers were about 1 inch long and 1 mil in diameter) were placed in a solution of 10 g. of copolymer of TFE/PDMOF (equiv. weight 950) in a solvent composed of 100 ml. of FC–75 and 900 ml. of trichlorotrifluoroethane and heated at 50° C. for one day, followed by filtering and drying. The resultant coated fiber after one hour treatment with 10 percent solution of NaOH was dyeable with cationic dye, namely methylene blue, whereas the uncoated fiber was not. In addition, the coated fiber, when placed in a bowl of water was wetted by the water as evidenced by the easy dispersability (by osterizing) of the fibers in the water as compared to the uncoated fiber which remained on the surface of the water and could not be dispersed. One benefit of the dispersability imparted to the fiber by the coating copolymer was exhibited by the coated fiber after dispersion and filtering-off of the water forming a loose paper-like sheet. The resultant sheet was pressed at 160° C. and 10,000 p.s.i.g. using polyester release paper and cooled under pressure to form a coherent sheeting. This sheeting is useful as a battery separator (preferably in the sulfonic acid form).

EXAMPLE IX

In this experiment, 225 denier polytetrafluoroethylene yarn (consisting of about 100 fibers) was passed on a continuous basis through the copolymer solution of Example VII at a residence time of two seconds. Following this coating step, the yarn was dried by contacting the running yarn with hot air at a temeprature of 180°–200° C. supplied by a hot-air gun. The resultant yarn was wound upon a spool which was placed in a 12 percent solution of NaOH at 60° C. for five hours, followed by rinsing and dipping in a dilute HCl solution and rinsing. The rinsing was done by unwinding the yarn in the rinse water. The resultant yarn was dyeable with "Sevron" dye, which is a cationic dye.

EXAMPLE X

A 225-denier, 30 filament zero twist yarn prepared as described in U.S. Patents 2,772,444 was coated with copolymer and the sulfonyl fluoride groups converted to sulfonic acid groups in the same manner as described in Example IX. The dynamic coefficient of friction of the yarn (dry) was determined substantially as described in U.S. Patent 3,414,646 and found to be 0.24 as compared to a value of 0.12 for the uncoated yarn.

The present invention also finds special usefulness in the production of fluorocarbon-insulated electrical wiring which has been coated with a surface active copolymer, thus rendering the object cementable, while the excellent insulation properties of the fluorocarbon polymer are retained.

The pore volumes described herein are measured by first weighing the wet sheeting sample (after removal of excess water from the surface of the sample), followed by drying and weighing the dry sheeting sample. The weight difference is the volume of water that is in the sheeting which is also the volume of the pores, and the dry weight of the sheeting is the weight of polymer, which divided by the density of the polymer is the volume of polymer in the sheeting. The sum of these two volumes divided by the pore volume × 100 gives the percent pore volume of the sheeting.

The percent pore volume so calculated based on weighings can be defined as the "wet basis" since once the porous sheeting is dried, the sheeting shrinks and the pore volume is reduced irreversibly by as much as 10 to 25%. Consequently, in order to preserve the higher pore volume, the porous sheeting is kept in the wet state, i.e. with a liquid medium such as water absorbed in its pores, from the time the particulate agent is leached out of the sheeting and continuing into use of the sheeting. The pore volumes, wet basis, disclosed herein apply to sheeting which has not been dried after leaching (until the dry weight determination on the sheeting is made).

As many apparently widely different embodiments of this invention may be made without departing from the spirit and scope thereof, it is to be understood that this invention is not limited to the specific embodiments thereof except as defined in the appended claims.

What is claimed is:

1. A surface-active fluorocarbon object comprising sheeting of fluorocarbon polymer coated with a copolymer of a fluorinated ethylene with a sulfonyl-containing fluorinated vinyl monomer of the formula $CF_2=CFR_fSO_2M$ or $CF_2=CFOR_fSO_2M$ wherein $R_f$ is a bifunctional perfluorinated radical comprising 2–8 carbon atoms, said $R_f$ radical being selected from the class of branched and unbranched radicals and M is F, Cl, OH, amine, or —OMe wherein Me is alkali metal or quaternary ammonium, said fluorocarbon polymer having fewer side chain sulfonyl groups than said copolymer, the equivalent weight of said fluorocarbon polymer is at least 1500 and the equivalent weight of the copolymer coating is no greater than 1150.

2. The object according to claim 1 wherein the sulfonyl-containing comonomer is perfluoro(3,6-dioxa-4-methyl-7-octenesulfonyl fluoride),

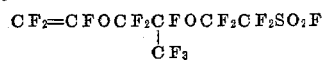

3. The object according to claim 1 wherein the copolymer comprises 5–60 percent perfluoro(3,6-dioxa-4-methyl-7-octenesulfonyl fluoride) and 40–95 percent tetrafluoroethylene.

4. The object according to claim 3 wherein the coating copolymer comprises 11–40 percent perfluoro(3,6-dioxa-4-methyl-7-octenesulfonyl fluoride) and 60–89 percent tetrafluoroethylene.

5. The object according to claim 1 wherein said core is porous.

6. Polytetrafluoroethylene fiber coated with a copolymer of a fluorinated ethylene with a sulfonyl-containing fluorinated vinyl monomer of the formula $$CF_2=CFR_fSO_2M$$

wherein $R_f$ is a bifunctional perfluorinated radical comprising 2–8 carbon atoms, said $R_f$ radical being selected from the class of branched and unbranched radicals and M is F, Cl, OH, amine, or —OMe wherein Me is alkali metal or quaternary ammonium.

7. A surface-active fluorocarbon object comprising sheeting of porous polytetrafluoroethylene coated with a copolymer of a fluorinated ethylene with a sulfonyl-containing fluorinated vinyl monomer on the surface and in the pores of the sheeting, said object having a pore volume of at least 40 percent, said vinyl monomer having the formula $CF_2=CFR_fSO_2M$ wherein $R_f$ is a bifunctional perfluorinated radical comprising 2–8 carbon atoms, said $R_f$ radical being selected from the class of branched and unbranched radicals and M is F, Cl, OH, amine, or —OMe wherein Me is alkali metal or quaternary ammonium.

8. The object of claim 7 wherein said polytetrafluoroethylene and said vinyl monomer are present as a blend with one another, the vinyl monomer making up 10 to 50 percent by weight of said blend.

References Cited

UNITED STATES PATENTS

| | | | |
|---|---|---|---|
| 3,282,875 | 11/1966 | Connolly et al. | 260—29.6 |
| 2,833,686 | 5/1958 | Sandt | 161—189 |
| 3,356,551 | 12/1967 | Glenn et al. | 161—189 |
| 3,041,317 | 6/1962 | Gibbs et al. | 260—543 F |
| 3,108,086 | 10/1963 | Russell et al. | 117—138.8 |
| 2,484,484 | 10/1949 | Berry | 260—29.6 X |
| 2,961,345 | 11/1960 | Petriello | 117—138.8 X |

FOREIGN PATENTS

| | | | |
|---|---|---|---|
| 666,361 | 7/1963 | Canada | 117—138.8 UF |
| 974,817 | 11/1964 | Great Britain. | |
| 1,049,328 | 11/1966 | Great Britain. | |

WILLIAM D. MARTIN, Primary Examiner

S. L. CHILDS, Assistant Examiner

U.S. Cl. X.R.

117—63, 161 UN, 232; 161—189, 254